(12) United States Patent
Li et al.

(10) Patent No.: US 7,928,168 B2
(45) Date of Patent: Apr. 19, 2011

(54) WHITE LIGHT-SHIELDING COMPOSITIONS AND ARTICLES COMPRISING SAME

(75) Inventors: Huihui Li, Shanghai (CN); Sriramakrishna Maruvada, Evansville, IN (US); Yaming Niu, Shijiazhuang (CN); Jong-Hyun Park, Kyunggi-do (KR); Jingwu Yang, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 785 days.

(21) Appl. No.: 11/690,327

(22) Filed: Mar. 23, 2007

(65) Prior Publication Data

US 2008/0230751 A1   Sep. 25, 2008

(51) Int. Cl.
*C08L 69/00* (2006.01)

(52) U.S. Cl. ........ 525/464; 524/424; 524/430; 524/431; 524/432; 524/611

(58) Field of Classification Search .......... None
See application file for complete search history.

(56) References Cited

U.S. PATENT DOCUMENTS

| | | | | |
|---|---|---|---|---|
| 3,189,662 | A | * | 6/1965 | Vaughn, Jr. ............... 528/33 |
| 5,025,055 | A | * | 6/1991 | Hamersma et al. .......... 524/269 |
| 5,153,251 | A | | 10/1992 | Lupinski et al. |
| 5,451,632 | A | | 9/1995 | Okumura et al. |
| 5,530,083 | A | * | 6/1996 | Phelps et al. ............... 528/25 |
| 5,837,757 | A | | 11/1998 | Nodera et al. |
| 6,133,360 | A | | 10/2000 | Barren et al. |
| 6,664,313 | B2 | | 12/2003 | Hirai et al. |
| 2002/0146550 | A1 | | 10/2002 | Hirai et al. |
| 2002/0147261 | A1 | | 10/2002 | Warth et al. |
| 2005/0085580 | A1 | | 4/2005 | Marugan et al. |
| 2006/0030664 | A1 | | 2/2006 | Kim |
| 2006/0047037 | A1 | | 3/2006 | Kawato et al. |
| 2008/0014376 | A1 | * | 1/2008 | Horio et al. ............... 428/1.6 |

FOREIGN PATENT DOCUMENTS

| | | |
|---|---|---|
| EP | 1217040 A1 | 6/2002 |
| EP | 1217040 B1 | 3/2005 |
| EP | 1555296 A1 | 7/2005 |
| EP | 1334153 B1 | 11/2006 |
| JP | 8059976 A | 3/1996 |
| JP | 9111109 A | 4/1997 |
| JP | 9279001 A | 10/1997 |
| JP | 11181267 A | 7/1999 |
| JP | 2000053854 A | 2/2000 |
| JP | 200212757 A | 1/2002 |
| JP | 200260615 A | 2/2002 |
| JP | 2002275366 A | 9/2002 |
| JP | 2002322291 A | 11/2002 |
| JP | 2003213114 A | 7/2003 |
| JP | 2004091567 A | 3/2004 |
| JP | 2004155985 A | 6/2004 |
| JP | 2006028267 A | 2/2006 |
| JP | 2006176566 A | 7/2006 |
| WO | WO00/24828 A1 | 5/2000 |
| WO | WO2004020522 A1 | 3/2004 |
| WO | WO2005037921 A1 | 4/2005 |
| WO | WO2006011532 A1 | 7/2005 |
| WO | WO 2005/103159 * | 11/2005 |
| WO | WO2007004762 A1 | 1/2007 |

* cited by examiner

*Primary Examiner* — Marc S Zimmer
(74) *Attorney, Agent, or Firm* — Cantor Colburn LLP

(57) ABSTRACT

A polymer composition is provided which is white and opaque (i.e. shields from light). The polymer composition comprises a blend of (i) a silicon-free polycarbonate polymer and (ii) a polycarbonate-polysiloxane copolymer; a whitener such as titanium dioxide; and (iii) a non-white colorant such as carbon black. The resulting composition, when molded and measured at a thickness of 0.75 mm, has an L* of greater than 80 and a % T of less than 1%. The composition also has good impact strength at low temperatures and good stability during processing.

22 Claims, No Drawings

WHITE LIGHT-SHIELDING COMPOSITIONS AND ARTICLES COMPRISING SAME

BACKGROUND

The present disclosure relates generally to white light-shielding polymer compositions. In particular, it relates to polycarbonate compositions which have a white color, are opaque (i.e. light-shielding), and exhibit good mechanical properties. Also included are articles formed (i.e. molded, extruded, etc.) from such compositions.

Polycarbonates are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous emulsion or in nonaqueous solution.

Polycarbonates have many properties and/or characteristics that are desired in certain instances. These include clarity or transparency (i.e. 90% light transmission or more), high impact strength, heat resistance, weather and ozone resistance, good ductility, being combustible but self-extinguishing, good electrical resistance, noncorrosive, nontoxic, etc. Furthermore, polycarbonates can be readily used in various article formation processes, such as molding (injection molding, etc.), extrusion, and thermoforming, among others. As a result, polycarbonates are used frequently to form a wide variety of products including: molded products, solution-cast or extruded films, structural parts, tubes and piping, lenses, safety shields, instrument windows, and medical devices. Household articles formed from polycarbonates can be produced in a great variety of colors and can be painted, glued, planed, pressed, and metalized and can be used to form precision parts and electronic products.

In view of some of the characteristics noted above, parts made from polycarbonate resins are continually being made thinner for various reasons. Among the reasons is a desire for consumer electronic products, such as cell phones, to be smaller and lighter. Polycarbonates are used, for example, to form the outside structure or housing of a cell phone.

One important property affected by the trend of thinner parts is opacity. Opacity is generally defined herein as the quality of not being penetrable by light. In this regard, the wall of a cell phone is opaque if light on one side of the wall cannot be seen on the other side of the wall. The property of opacity, or light-shielding, ensures that light only appears where it is desired. For example, the number keys of a cell phone should be lit, but not the space between the number keys. Opacity is measured by the percent transmission (% T) of light through an article having a defined thickness. The lower the % T, the more opaque the article is. Light-shielding is progressively more difficult to achieve as the part thickness decreases.

Other desired properties for forming thinner parts include good mechanical properties (e.g. impact strength at low temperatures), dimensional stability, and stability of the polymer during processing. When a dark-colored polycarbonate is acceptable for end use, high opacity or light-shielding is easily achieved by the use of dark colorants. However, when the polycarbonate must be white, it is more difficult to achieve high opacity, especially as the part thickness decreases. Whiteners such as titanium dioxide ($TiO_2$) and zinc oxide (ZnO) are known to maintain a white color and increase opacity. However, high loadings, for example 15 weight percent to 20 weight percent $TiO_2$ or more, are needed to create a product with a % T of less than 1% for part thicknesses of 1.0 millimeter or less. At these high loadings, properties such as stability of the polymer during processing and mechanical properties such as impact strength are adversely affected. In addition, these additives increase the weight of the finished article, which is also contrary to trends in the consumer electronics industry.

It would be desirable to provide light-shielding polycarbonate compositions which are of white color, opaque, have superior impact strength over a wide range of temperatures, especially at low temperatures of less than 0° C., and have favorable resin stability during processing of articles having wall thicknesses of 1 millimeter or less.

BRIEF DESCRIPTION

Disclosed, in various embodiments, are polymer compositions, including polycarbonate compositions, which have a white color, are opaque (i.e. shield white light), and exhibit good mechanical properties.

In embodiments, a light-shielding polymer composition has (A) a whiteness L* of 80 or greater on the CIELAB scale; and (B) less than 1% transmission of white light when molded and measured at a thickness of 0.75 millimeter; and comprises at least one whitener, at least one non-white colorant, and a blend of (i) a silicon-free polycarbonate polymer and (ii) a polycarbonate-siloxane copolymer.

The polycarbonate polymer may be a bisphenol A polycarbonate, a copolycarbonate other than a polycarbonate-polysiloxane copolymer, or a polycarbonate homopolymer.

The polysiloxane block of the polycarbonate-polysiloxane copolymer may be derived from a polysiloxane having hydroxy end groups and having the formula:

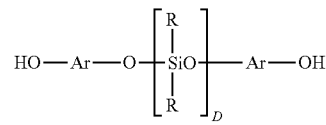

wherein D is from about 5 to about 200; each R is the same or different and is a $C_{1-13}$ monovalent organic group; and Ar is a substituted or unsubstituted $C_{6-30}$ arylene group; or the polysiloxane block of the polycarbonate-polysiloxane copolymer may be derived from a polysiloxane having hydroxy end groups and having the formula:

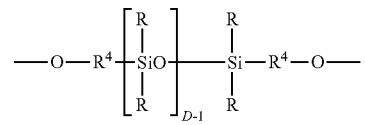

wherein D is on average from about 5 to about 200; each R is the same or different and is a $C_{1-13}$ monovalent organic group; and each $R^6$ is independently a $C_{7-30}$ arylene-alkylene group.

In specific embodiments, the polysiloxane block of the polycarbonate-polysiloxane copolymer may be derived from a polysiloxane having hydroxy end groups of the formula:

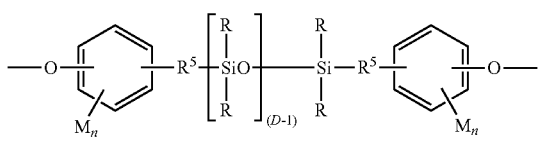

wherein D is on average from about 5 to about 200; each R is the same or different and is a $C_{1-13}$ monovalent organic group; each $R^3$ is independently a divalent $C_{2-8}$ aliphatic group; each M is the same or different and is a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy; and each n is independently 0 to 4.

In further embodiments, the polycarbonate-polysiloxane copolymer comprises the formula:

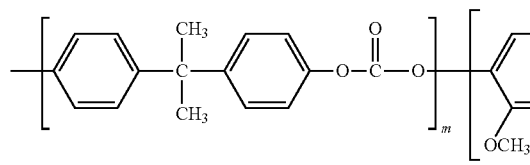

wherein E is on average from about 5 to about 200; and the weight ratio of m to n is 99:1 to 90:10.

The whitener may comprise at least one light scattering agent selected from titanium dioxide, zinc oxide, barium sulfate, and combinations thereof. The whitener may be present in the amount of from greater than 0 to about 20 parts per hundred parts of the blend. In other embodiments, the whitener may be present in the amount of from about 4 to about 20 parts per hundred parts of the blend. In further embodiments, the whitener may be present in the amount of from about 4 to about 15 parts per hundred parts of the blend.

The non-white colorant may comprise at least one light-absorbing colorant. Non-limiting examples of non-white colorants include carbon black, Pigment Brown 24, Solvent Violet 13, Solvent Blue 104, Solvent Green 3, Solvent Violet 36, and Solvent Red 135, and mixtures thereof. In specific embodiments, the non-white colorant is carbon black.

The non-white colorant may be present in the amount of from greater than 0 to about 250 ppm. More specifically, the non-white colorant may be present in the amount of from greater than 0 to about 50 ppm. Most specifically, the non-white colorant may be present in the amount of from greater than 0 to about 5 ppm.

In specific embodiments, the composition comprises a blend of (i) a silicon-free polycarbonate polymer and (ii) a polycarbonate-polysiloxane copolymer; titanium dioxide in the amount of from about 4 to about 20 parts per hundred parts of the blend; and carbon black in the amount of from about 1 to about 5 ppm.

The polymer composition may have a whiteness L* of 85 or greater on the CIELAB scale. In specific embodiments, the polymer composition may have a whiteness L* of 90 or greater on the CIELAB scale.

The polymer composition may have an impact strength of greater than 200 J/m at minus 30° C. according to ASTM D256. In specific embodiments, the polymer composition may have an impact strength of greater than 650 J/m at minus 30° C. according to ASTM D256.

In other embodiments, a light-shielding polymer composition is disclosed which may comprise:
    a blend of (i) a silicon-free polycarbonate polymer and (ii) a polycarbonate-polysiloxane copolymer;
    at least one light-scattering colorant in the amount of from about 4 to about 20 parts per hundred parts of the blend; and
    at least one light-absorbing colorant in the amount of from about 1 to about 5 ppm;
    wherein the composition has (A) a whiteness L* of 90 or greater on the CIELAB scale; and (B) less than 1% transmission of white light when molded and measured at a thickness of 0.75 millimeter.

In further embodiments, the light-scattering colorant is titanium dioxide.

In other embodiments, the light-absorbing colorant is selected from the group consisting of carbon black, Pigment Brown 24, Solvent Violet 13, Solvent Blue 104, Solvent Green 3, Solvent Violet 36, and Solvent Red 135, and mixtures thereof. In specific embodiments, the light-absorbing colorant is carbon black.

Also disclosed in additional embodiments is a method of forming a molded article having (A) a whiteness L* of 80 or greater on the CIELAB scale; and (B) less than 1% transmission of white light when molded and measured at a thickness of 0.75 millimeter, comprising:
    providing a polymer composition comprising at least one whitener, at least one non-white colorant, and a blend of (i) a silicon-free polycarbonate polymer and (ii) a polycarbonate-polysiloxane copolymer; and
    molding the polymer composition to form a molded article.

In still further embodiments, light-shielding molded articles formed from the polymer compositions provided herein are also disclosed.

These and other non-limiting characteristics of the compositions and articles of the disclosure are more particularly described below.

DETAILED DESCRIPTION

The present disclosure relates to white-colored polymer compositions that are opaque and have good impact resistance and heat stability. The whiteness of the polymer composition, such as white colored polycarbonate compositions, may be measured according to the CIELAB color space. The CIELAB color space has three parameters: L*, a*, and b*. L* represents the lightness of the color, where L*=0 is black and L*=100 is white. In this disclosure, the value of L* for the polymer composition is used to measure its whiteness. A polymer composition having an L* of 80 or greater is considered to be white. In specific embodiments, the polymer composition has an L* of 85 or greater. In further embodiments, the polymer composition has an L* of 90 or greater.

The polymer composition is also opaque to white light. The term "white light" is intended to cover all light in the visible spectrum, or all wavelengths from 380 nanometers to 780 nanometers. As previously noted, the opacity of the polymer composition is measured by the % T at a particular thickness. The polymer composition transmits less than 1% of light at all wavelengths from 380 nanometers to 780 nanometers. The % T should be measured with an article that is 0.75 millimeter thick. A D65 light source, 18 watt/220 volt, and 6500 Kelvin color temperature should be used with testing across the range of 380 to 780 nanometers at 5 nm intervals.

With respect to the polymers discussed herein, the term "hydrocarbyl" refers to a straight or branched chain, substituted or unsubstituted hydrocarbon group including aromatic and/or aliphatic groups; the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any one or more hydrogens on the designated atom or group are replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

The polymer composition comprises a polycarbonate polymer. Types of polycarbonate polymers include homopolycarbonates (or polycarbonate homopolymers), copolycarbonates (or polycarbonate copolymers), and polyester-polycarbonates.

As used herein, the terms "polycarbonate" and "polycarbonate resin" mean compositions having repeating structural carbonate units of the formula (1):

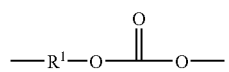

(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

(2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH \qquad (3)$$

wherein $Y^1$, $A^1$ and $A^2$ are as described above. Also included are bisphenol compounds of general formula (4):

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

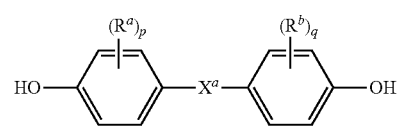

(5)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

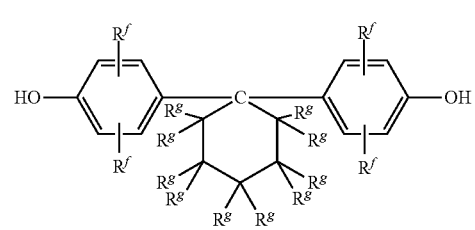

(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In specific embodiments, the polycarbonate polymer is derived from bisphenol A, in which each of $A^1$ and $A^2$ is p-phenylene and $Y^1$ is isopropylidene. The polycarbonate may have an intrinsic viscosity, as determined in chloroform at 25° C., of from about 0.3 to about 1.5 deciliters per gram (dl/g), specifically from about 0.45 to about 1.0 dl/g. The polycarbonates may have a weight average molecular weight (Mw) of from about 15,000 to about 35,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has a melt volume flow rate (often abbreviated MVR). The MVR measures the rate at which a thermoplastic passes vertically through a capillary under a defined weight load. The MVR is measured in cubic cm per 10 minutes (cc/10 min). Polycarbonates useful for the formation of thin articles may have an MVR, measured at 300° C. under a load of 1.2 kg according to ASTM D1238-04, of from about 0.5 to about 80 cubic centimeters per 10 minutes (cc/10 min). In a specific embodiment, a useful polycarbonate composition has an MVR measured at 300° C. under a load of 1.2 kg according to ASTM D1238-04, of from about 0.5 to about 50 cc/10 min, specifically from about 0.5 to about 25 cc/10 min, and more specifically from about 1 to about 15 cc/10 min. Mixtures of polycarbonates of different flow properties may be used to achieve the overall desired flow property.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), repeating units of formula (8):

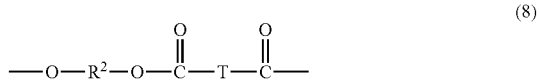

(8)

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In an embodiment, $R^2$ is a $C_{2-30}$ alkylene group having a straight chain, branched chain, or cyclic (including polycyclic) structure. In another embodiment, $R^2$ is derived from an aromatic dihydroxy compound of formula (4) above. In another embodiment, $R^2$ is derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

In a specific embodiment, the polyester unit of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A.

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

All types of polycarbonate end groups are contemplated as being useful in the polycarbonate polymer, provided that such end groups do not significantly adversely affect desired properties of the polymer compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonates and branched polycarbonates may be used.

A chain stopper (also referred to as a capping agent) may be included during polymerization. The chain stopper controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Melt processes are generally carried out in a series of stirred tank reactors. The reaction can be carried out by either a batch mode or a continuous mode. The apparatus in which the reaction is carried out can be any suitable tank, tube, or column. Continuous processes usually involve the use of one or more continuous-stirred tank reactors (CSTRS) and one or more finishing reactors.

The polycarbonate polymer may be used to adjust the MVR of the polymer composition. In particular, the polycarbonate polymer contains no silicon. In specific embodiments, the polycarbonate polymer is a polycarbonate homopolymer.

The polymer composition further comprises a polycarbonate-polysiloxane copolymer. The polysiloxane (also referred to herein as "polydiorganosiloxane") blocks of the copolymer comprise repeating siloxane units (also referred to herein as "diorganosiloxane units") of formula (9):

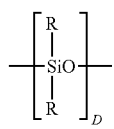

(9)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (9) may vary widely depending on the desired properties of the composition, and like considerations. Generally, D may have an average value of 2 to 1,000, specifically 2 to 500, and more specifically 5 to 200. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polycarbonate-polysiloxane copolymer may be used, wherein the average value of D of the first copolymer is less than the average value of D of the second copolymer.

In one embodiment, the polydiorganosiloxane blocks are provided by repeating structural units of formula (10):

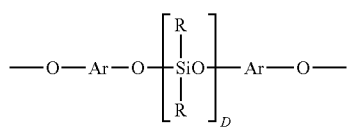
(10)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (10) may be derived from the corresponding dihydroxy compound of formula (11):

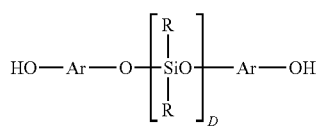
(11)

wherein R, Ar, and D are as described above. Compounds of formula (11) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (12):

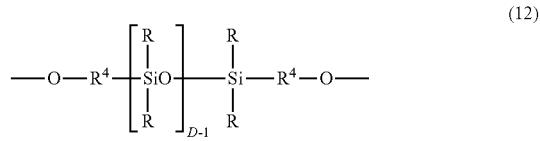
(12)

wherein R and D are as described above, and each occurrence of R is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (13):

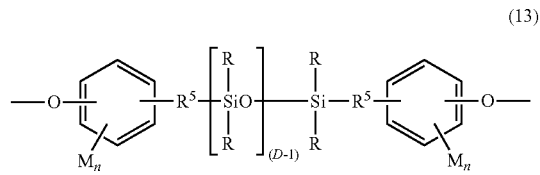
(13)

wherein R and D are as defined above. Each $R^5$ in formula (13) is independently a divalent $C_2$-$C_8$ aliphatic group. Each M in formula (13) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (13) may be derived from the corresponding dihydroxy polydiorganosiloxane (14):

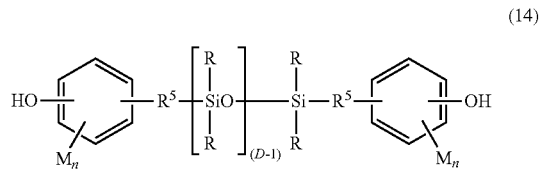
(14)

wherein R, D, M, $R^5$, and n are as described above. Such dihydroxy polysiloxanes can be made by effecting a platinum catalyzed addition between a siloxane hydride of formula (15):

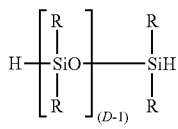

(15)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In an embodiment, the polycarbonate-polysiloxane may comprise polysiloxane units, and carbonate units derived from bisphenol A, e.g., the dihydroxy compound of formula (3) in which each of $A^1$ and $A^2$ is p-phenylene and $Y^1$ is isopropylidene. Polycarbonate-polysiloxanes may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

In an embodiment, the polycarbonate-polysiloxane copolymer comprises polysiloxane blocks derived from the corresponding dihydroxy polysiloxane compound that are present in an amount of 0.15 to 30 wt %, specifically 0.5 to 25 wt %, and more specifically 1 to 20 wt % based on the total weight of the copolymer. In a specific embodiment, the polysiloxane blocks are present in an amount of 1 to 10 wt %, specifically 2 to 9 wt %, and more specifically 3 to 8 wt %, based on the total weight of the copolymer.

The polycarbonate-polysiloxane copolymer further comprises a carbonate unit of formula (1) derived from a dihydroxy aromatic compound of formula (4). In an exemplary embodiment, the dihydroxy aromatic compound is bisphenol A. In an embodiment, the carbonate units comprising the copolymer are present in an amount of 70 to 99.85 wt %, specifically 75 to 99.5, and more specifically 80 to 99 wt % based on the total weight of the copolymer. In a specific embodiment, the carbonate units are present in an amount of 90 to 99 wt %, specifically 91 to 98 wt %, and more specifically 92 to 97 wt %, based on the total weight of the copolymer.

In an exemplary embodiment, the polycarbonate-polysiloxane copolymer has the formula (16):

kg, of 1 to 50 cubic centimeters per 10 minutes (cc/10 min), specifically 2 to 30 cc/10 min. Mixtures of polycarbonate-polysiloxanes of different flow properties may be used to achieve the overall desired flow property. Exemplary polycarbonate-polysiloxanes are marketed under the trade name LEXAN® EXL polycarbonates, available from GE Plastics.

In specific embodiments, the polymer composition comprises a blend of (i) a silicon-free polycarbonate polymer and (ii) a polycarbonate-polysiloxane copolymer. The polycarbonate-polysiloxane copolymer may contain from about 0.1% to about 20% siloxane by weight of the copolymer. In specific embodiments, the polycarbonate-polysiloxane copolymer contains around 20% siloxane by weight of the copolymer. In specific embodiments, the polycarbonate polymer may have a weight average molecular weight of from about 15,000 to about 35,000. In further specific embodiments, the polycarbonate polymer is a polycarbonate homopolymer having a weight average molecular weight of from about 15,000 to about 35,000. The silicon-free polycarbonate polymer and copolymer are blended to achieve the desired mechanical properties, such as the MVR, ductility, and the final % siloxane of the polymer composition. The blend may comprise from about 2% to about 98% by weight of the polycarbonate polymer and from about 98% to about 2% by weight of the polycarbonate-polysiloxane copolymer. The final blend may contain from about 0.002% to about 20% by weight of siloxane. In specific embodiments, the final blend contains from about 0.002% to about 8% by weight of siloxane. In more specific embodiments, the final blend contains from about 0.002% to about 5% by weight of siloxane.

The polymer composition further comprises at least one whitener which gives the polymer composition a white color. The white color of the polymer composition and the white color of the article molded from the polymer composition should not be confused with the white light which is blocked by the opaque effect of the polymer composition. The whitener generally works by reflecting light, such that light coming from one side of a product containing the whitener does not pass through, but is reflected back in the direction it came from. Any whitener known in the art, such as titanium dioxide, zinc oxide, and barium sulfate, may be used. In specific embodiments, the whitener is present in the amount of from greater than 0 to about 20 parts per hundred parts of the polymer blend. In further embodiments, the whitener is present in the amount of from about 4 to about 20 parts per hundred parts of the blend. In still narrower embodiments, the whitener is present in the amount of from about 4 to about 15 parts per hundred parts of the blend. Titanium dioxide particles may further comprise an organic coating to reduce surface reactivity and improve handling characteristics.

(16)

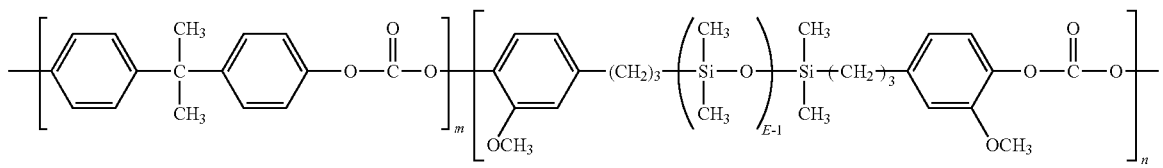

wherein E is on average 5 to 200, and the weight ratio of m to n is 99:1 to 90:10.

The polycarbonate-polysiloxane copolymer can have a melt volume flow rate, measured at 300° C. under a load of 1.2

The polymer composition further comprises at least one non-white colorant. The non-white colorant generally works by absorbing light, such that it does not pass through to the other side. It has been unexpectedly found that the addition of a trace amount of non-white colorant disproportionately increases the opacity of the polymer composition without affecting its whiteness. In other words, a trace amount of non-white colorant disproportionately reduces the amount of whitener that would otherwise need to be added to the polymer composition to achieve high opacity. The non-white colorant is present in the amount of from greater than 0 to about 250 ppm. In further specific embodiments, the non-white colorant is carbon black, present in the amount of from greater than 0 to about 50 ppm. In more specific embodiments, the non-white colorant is carbon black, present in the amount of from about 1 to about 5 ppm.

The non-white colorant may generally be any colorant that is not white. In specific embodiments, the non-white colorant comprises carbon black. Other suitable colorants include pigments and dyes. Generally, the non-white colorant has a dark color, such as black, brown, violet, and purple, or is a combination of colorants that achieves a dark color. Other suitable non-white colorants include, but are not limited to, Pigment Brown 24, Solvent Violet 13, Solvent Blue 104, Solvent Green 3, Solvent Violet 36, and Solvent Red 135

In some specific embodiments, the polymer composition comprises a blend of (i) a silicon-free polycarbonate homopolymer and (ii) a polycarbonate-polysiloxane copolymer; titanium dioxide in the amount of from about 4 to about 20 parts per hundred parts of the blend; and carbon black in the amount of from about 1 to about 5 ppm. In other words, titanium dioxide is the whitener and carbon black is the non-white colorant.

The polymer compositions of the present disclosure exhibit good impact strength at low temperatures. In particular embodiments, the polymer composition has an impact strength of greater than 200 J/m at minus 30° C. according to ASTM D256, or in more specific embodiments greater than 650 J/m at minus 30° C. They also exhibit high ductility. In particular embodiments, the polymer composition has a ductility of 100% at minus 30° C. They also exhibit good heat stability. In embodiments, the change in the melt volume flow rate (300° C., 1.2 kg) for 6 minutes dwell time and 18 minutes dwell time is less than 10% for the polymer composition.

The polymer compositions are suited for making white-colored articles having thin walls which must still have high opacity. Shaped, formed, or molded articles comprising the polymer compositions are also provided. The polymer compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones and digital cameras, fixed electrical enclosures such as exit signs, humidifier housings and HVAC (heat ventilation and air conditioning) housings, electrical connectors, and components of lighting fixtures, ornaments, home appliances, roofs, greenhouses, sun rooms, swimming pool enclosures, and the like.

The polymer compositions may also be used to form films or sheets. It is common in the art to refer to certain articles synonymously as "films" or "sheets" in many instances, so these terms do not necessarily refer to mutually exclusive embodiments. However, a film may optionally be defined as a layer having a thickness of about 0.1 to about 1000 micrometers, while in general a sheet or other molded article has a thickness of greater than about 1000 micrometers to about 20 millimeters (mm). Such films and sheets are useful by themselves or in combination with a substrate, and can be used in articles for the transportation and construction industry. Such articles include ceilings, sidewalls, bin doors, partitions, window masks, seats, seat back shrouds, seat backs, armrests, tray-tables, storage bins and luggage racks in automobiles such as trains, buses and aircraft.

The films or sheets may be formed by processes such as film and sheet extrusion, injection molding, gas-assist injection molding, extrusion molding, compression molding, blow molding, and combinations comprising at least one of the foregoing processes. Film and sheet extrusion processes may include and are not limited to melt casting, blown film extrusion and calendaring. Co-extrusion and lamination processes may be used to form multi-layer films or sheets. The disclosed films and sheets may alternatively be prepared by casting a solution or suspension of the composition in a suitable solvent onto a substrate, belt or roll, followed by removal of the solvent. Multi-layered articles (also referred to herein as "laminates") comprising at least two layers each comprising a film or sheet may be formed in various ways known in the art. As used herein, the term "laminate" includes, but is not limited to, multi-layer films, multi-layer sheets, and laminated layers of sheets and films. Laminates may be made by any one of a variety of manufacturing methods including but not limited to co-injection molding, co-extrusion lamination, co-extrusion blow film molding, co-extrusion, overmolding, multi-shot injection molding, sheet molding, and the like. Single or multiple layers of coatings may also be applied to the single or multi-layer films, sheets or articles comprising the polymer compositions described herein, to impart additional properties such as scratch resistance, ultraviolet light resistance, aesthetic appeal, and the like. Coatings may be applied through standard application techniques such as rolling, spraying, dipping, brushing, flow coating, or combinations comprising at least one of the foregoing application techniques.

Oriented films may be prepared through blown film extrusion or by stretching cast or calendared films in the vicinity of the thermal deformation temperature using standard stretching techniques. For instance, a radial stretching pantograph may be employed for multi-axial simultaneous stretching; an x-y direction stretching pantograph may be used to simultaneously or sequentially stretch in the planar x-y directions. Equipment with sequential uniaxial stretching sections may also be used to achieve uniaxial and biaxial stretching, such as a machine equipped with a section of differential speed rolls for stretching in the machine direction and a tenter frame section for stretching in the transverse direction.

The films and sheets described above, including multiwall sheets, may be thermoplastically processed into shaped articles via forming and molding processes including but not limited to thermoforming, vacuum forming, pressure forming, injection molding and compression molding.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

In addition to the components described hereinabove, the polymer composition may further include various other additives ordinarily incorporated with polymer compositions of this type, with the proviso that the additives are selected so as not to adversely affect the desired properties of the polymer composition. Such additives include antioxidants, heat stabilizers, light stabilizers, ultraviolet light absorbers, plasticizers, mold release agents, lubricants, antistatic agents, flame retardants, anti-drip agents, gamma stabilizers, or combinations thereof. The additives usually comprise a total of no more than one part per hundred of the blend.

Useful heat stabilizers include, for example, organophosphites such as triphenyl phosphite, tris-(2,6-dimethylphenyl) phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. An especially suitable heat stabilizer is tris(2,4-di-t-butylphenyl)phosphate, available as IRGAPHOS™ 168.

Useful UV absorbing additives include, for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene) bis(4H-3, 1-benzoxazin-4-one); and 1,3-bis[[(2-cyano-3,3-diphenylacryloyl)oxy]-2,2-bis[[(2-cyano-3,3-diphenylacryloyl)oxy]methyl]propane. An especially suitable UV absorbing additive is 2-(2'-hydroxy-t-t-octylphenyl)-benzotriazole.

The polymer compositions of the present disclosure may be manufactured by methods generally available in the art. The polymer compositions may be molded into useful shaped articles by a variety of means such as injection molding, compression molding, extrusion, rotational molding, blow molding and thermoforming.

The following examples are provided to illustrate the polymer compositions, articles, and methods of the present disclosure. The examples are merely illustrative and are not intended to limit devices made in accordance with the disclosure to the materials, conditions, or process parameters set forth therein.

EXAMPLES

Example 1

Four different compositions T1-T4 were formulated and tested for impact strength and heat stability. The polycarbonate-polysiloxane copolymer (PC-Si copolymer) had 20% siloxane by weight. The polycarbonate homopolymer PC-A was a high flow Bisphenol A polycarbonate with a target molecular weight of 21,900 (based on GPC using polycarbonate standards). The polycarbonate homopolymer PC-B was a low flow Bisphenol A polycarbonate with a target molecular weight of 29,900. PETS was used as a mold release agent. IRGAPHOS™ 168 (tris(2,4-di-t-butylphenyl)phosphate was used as a heat stabilizer. 2-(2'hydroxy-5-t-octylphenyl)-benzotriazole was used as an UV stabilizer. T1 was a blend of polycarbonate homopolymer and polycarbonate-polysiloxane copolymer. T2 added TiO$_2$ to the blend of T1. T3 was a blend of two polycarbonate homopolymers. T4 added TiO$_2$ to the blend of T3. T1 and T3 were formed into chips 1.0 mm thick; T2 and T4 were formed into chips 0.75 mm thick.

The sum of the polycarbonate homopolymers and the PC-Si copolymer added up to 100 parts. The additives were measured in parts per hundred parts resin (phr).

The MVR was measured according to ASTM D1238 at 300° C. under load of 1.2 kg at 6 minutes and 18 minutes dwell time. The impact strength was measured according to the Izod notch impact test according to ASTM D256 at 23° C. and minus 30° C. The results are shown in Table 1.

TABLE 1

|  | Unit | T1 | T2 | T3 | T4 |
|---|---|---|---|---|---|
| PC—Si Copolymer | parts | 17.5 | 17.5 | 0 | 0 |
| PC—A | parts | 45 | 40 | 10 | 10 |
| PC—B | parts | 37.5 | 32.5 | 90 | 90 |
| PETS mold release agent | phr | 0 | 0 | 0.4 | 0.4 |
| Heat Stabilizer | phr | 0.1 | 0.1 | 0.1 | 0.1 |
| TiO2 | phr | 0 | 10 | 0 | 10 |
| UV Stabilizer | phr | 0 | 0.3 | 0.3 | 0.3 |
| MVR(300 C, 1.2 kg)-6 min. | g | 9.8 | 9.1 | 9.1 | 8.9 |
| MVR(300 C, 1.2 kg)-18 min. | g | 10.2 | 9.7 | 9.8 | 14.1 |
| Izod/Notch@ 23° C. | J/m | 897 | 817 | 894 | 909 |
| Ductility @ 23° C. | % | 100 | 100 | 100 | 100 |
| Izod/Notch@ −30° C. | J/m | 823 | 743 | 145 | 89 |
| Ductility @ −30° C. | % | 100 | 100 | 0 | 0 |
| % Transmission @ 0.75 mm | % | — | 1.2 | — | 1.7 |
| % Transmission @ 1.0 mm | % | 75 | — | 88 | — |

Comparing T1 and T2 showed that adding TiO$_2$ to the polymer blend reduced its impact strength by about 10% at minus 30° C. However, both were 100% ductile at minus 30° C. However, as seen in T3 and T4, adding TiO$_2$ to only polycarbonate (without the PC-Si copolymer) lowered its impact strength by almost 40% and both were completely brittle, as shown by 0% ductility. The MVR for T4 also shifted by about 60%, indicating polymer degradation due to the presence of TiO$_2$. Comparing T2 to T4 showed that a blend of PC Si copolymer with the polycarbonate homopolymer produced better results than simply using polycarbonate homopolymer alone. This is seen in the impact strength at minus 30° C. and the % T. The polymer blend of T2 had greater opacity or light-shielding.

Example 2

Six different compositions B1-B6 were formulated. Each composition included 45 parts PC-A, 37.5 parts PC-B, 17.5 parts PC-Si copolymer, 0.1 parts heat stabilizer, and 0.3 parts UV stabilizer. Each composition had a varying amount of TiO$_2$ and various colorants. Each composition was formed into chips of 0.75 millimeter thickness and tested for whiteness on the CIELAB color space, % T, Izod at 23° C., and ductility. The results were averaged and are shown in Table 2. Note that PC-A and PC-B are referred to together as "Polycarbonate" in this and further Tables.

TABLE 2

|  | Unit | B1 | B2 | B3 | B4 | B5 | B6 |
|---|---|---|---|---|---|---|---|
| Polycarbonate | parts | 82.5 | 82.5 | 82.5 | 82.5 | 82.5 | 82.5 |
| PC—Si Copolymer | parts | 17.5 | 17.5 | 17.5 | 17.5 | 17.5 | 17.5 |
| Heat Stabilizer | phr | 0.1 | 0.1 | 0.1 | 0.1 | 0.1 | 0.1 |

TABLE 2-continued

|  | Unit | B1 | B2 | B3 | B4 | B5 | B6 |
|---|---|---|---|---|---|---|---|
| UV Stabilizer | phr | 0.3 | 0.3 | 0.3 | 0.3 | 0.3 | 0.3 |
| $TiO_2$ | parts | 6 | 12 | 6 | 4 | 4 | 9 |
| Pigment Brown 24 | parts | 0 | 0 | 0.0087 | 0.0058 | 0.0058 | 0.0131 |
| Solvent Violet 13 | parts | 0 | 0 | 0.0046 | 0.0031 | 0.0031 | 0.0069 |
| Carbon Black | parts | 0 | 0 | 0.00016 | 0.00011 | 0.00032 | 0.00024 |
| L* @0.75 mm | na | 96.6 | 97.4 | 90.4 | 90.4 | 90.0 | 90.3 |
| a* @0.75 mm | na | −0.4 | −0.4 | 1.4 | 1.3 | 1.2 | 1.3 |
| b* @0.75 mm | na | 1.7 | 1.7 | −16.0 | −16.0 | −15.3 | −16.0 |
| % T @0.75 mm | % | 2.4 | 0.9 | 0.1 | 0.3 | 0.3 | 0 |
| Izod @ 23° C. | J/m | 843 | 812 | 842 | 890 | 895 | 817 |
| Ductility | % | 100 | 100 | 100 | 100 | 100 | 100 |

The unexpected effect of the non-white colorants can be seen in B3-B6. Even though the amount of $TiO_2$ is much less than in B2, the % T is much lower due to the presence of the non-white colorants. In addition, the addition of non-white colorants did not reduce the L* of B3-B6 below 80.

Example 3

Several control compositions were made. Compositions $C_1$-$C_7$ used a blend of polycarbonate homopolymer and PC-Si copolymer, varying the amount of carbon black. The sample thicknesses were 0.75 mm. The results are shown in Table 3.

TABLE 3

|  | Unit | C1 | C2 | C3 | C4 | C5 | C6 | C7 |
|---|---|---|---|---|---|---|---|---|
| Polycarbonate | parts | 82.5 | 82.5 | 82.5 | 82.5 | 82.5 | 82.5 | 82.5 |
| PC—Si Copolymer | parts | 17.5 | 17.5 | 17.5 | 17.5 | 17.5 | 17.5 | 17.5 |
| Heat Stabilizer | phr | 0.1 | 0.1 | 0.1 | 0.1 | 0.1 | 0.1 | 0.1 |
| UV Absorber | phr | 0.3 | 0.3 | 0.3 | 0.3 | 0.3 | 0.3 | 0.3 |
| Carbon Black | phr | 0 | 0.0001 | 0.0003 | 0.0005 | 0.001 | 0.005 | 0.01 |
| L* @0.75 mm |  | 93.2 | 91.6 | 90 | 87.8 | 83.6 | 60.1 | 43.2 |
| % T @0.75 mm | % | 80.7 | 78.8 | 78.6 | 76.5 | 72 | 46.8 | 27.2 |
| MVR | cc/10 min | 10 | 10.6 | 10 | 9.9 | 10 | 10.1 | 10.1 |
| Izod @ 23° C. | J/m | 902 | 906 | 901 | 902 | 902 | 902 | 884 |
| Ductility @ 23° C. | % | 100 | 100 | 100 | 100 | 100 | 100 | 100 |
| Izod @ −30° C. | J/m | 799 | 793 | 797 | 816 | 814 | 800 | 795 |
| Ductility @ −30° C. | % | 100 | 100 | 100 | 100 | 100 | 100 | 100 |

Compositions $C_8$-$C_{14}$ used only polycarbonate homopolymer, varying the amount of carbon black. The sample thicknesses were 0.75 mm. The results are shown in Table 4.

TABLE 4

|  | Unit | C8 | C9 | C10 | C11 | C12 | C13 | C14 |
|---|---|---|---|---|---|---|---|---|
| Polycarbonate | parts | 100 | 100 | 100 | 100 | 100 | 100 | 100 |
| PC—Si Copolymer | parts | 0 | 0 | 0 | 0 | 0 | 0 | 0 |
| PETs | phr | 0.4 | 0.4 | 0.4 | 0.4 | 0.4 | 0.4 | 0.4 |
| Heat Stabilizer | phr | 0.1 | 0.1 | 0.1 | 0.1 | 0.1 | 0.1 | 0.1 |
| UV Absorber | phr | 0.3 | 0.3 | 0.3 | 0.3 | 0.3 | 0.3 | 0.3 |
| Carbon Black | phr | 0 | 0.0001 | 0.0003 | 0.0005 | 0.001 | 0.005 | 0.01 |
| L* @0.75 mm |  | 96.5 | 94.9 | 93.8 | 91.9 | 89.7 | 64.4 | 46.1 |
| % T @0.75 mm | % | 91.2 | 89.3 | 88.1 | 86.1 | 83.4 | 54.4 | 33.5 |
| MVR | cc/10 min | 7.7 | 8.0 | 7.8 | 7.8 | 7.9 | 7.9 | 8.1 |
| Izod @ 23° C. | J/m | 965 | 944 | 942 | 981 | 967 | 921 | 967 |

TABLE 4-continued

| | Unit | C8 | C9 | C10 | C11 | C12 | C13 | C14 |
|---|---|---|---|---|---|---|---|---|
| Ductility @ 23° C. | % | 100 | 100 | 100 | 100 | 100 | 100 | 100 |
| Izod @ −30° C. | J/m | 623 | 597 | 727 | 334 | 575 | 597 | 625 |
| Ductility @ −30° C. | % | 60 | 60 | 80 | 20 | 60 | 60 | 60 |

Comparing Tables 3 and 4, the data above showed that the polymer composition affected the impact strength and ductility at minus 30° C. In particular, the homopolymer/polycarbonate-polysiloxane copolymer blend performed better than the homopolymer alone. In addition, small amounts of carbon black did not affect % T or L*, but did at larger amounts. When the loading of carbon black exceeded 0.005 phr (50 ppm), the L* values dropped below 80 (C6, C7, C13, C14), indicating such loadings were no longer preferred for creating white compositions.

Compositions C15-C19 used a blend of polycarbonate homopolymer and PC-Si copolymer, varying the amount of titanium dioxide. The sample thicknesses were 0.75 mm. The results are shown in Table 5.

TABLE 5

| | Unit | C15 | C16 | C17 | C18 | C19 |
|---|---|---|---|---|---|---|
| Polycarbonate | parts | 82.5 | 82.5 | 82.5 | 82.5 | 82.5 |
| PC—Si Copolymer | parts | 17.5 | 17.5 | 17.5 | 17.5 | 17.5 |
| Heat Stabilizer | phr | 0.1 | 0.1 | 0.1 | 0.1 | 0.1 |
| UV Absorber | phr | 0.3 | 0.3 | 0.3 | 0.3 | 0.3 |
| $TiO_2$ | phr | 0 | 5 | 10 | 15 | 25 |
| L* @0.75 mm | | 92.5 | 96.9 | 97.5 | 97.7 | 97.9 |
| % T @0.75 mm | % | 79.2 | 2.8 | 1 | 0.4 | 0.1 |
| MVR | cc/10 min | 9.9 | 11.1 | 11.0 | 10.7 | 9.8 |
| Izod @ 23° C. | J/m | 886 | 827 | 771 | 716 | 639 |
| Ductility @ 23° C. | % | 100 | 100 | 100 | 100 | 100 |
| Izod @ −30° C. | J/m | 786 | 739 | 647 | 591 | 506 |
| Ductility @ −30° C. | % | 100 | 100 | 100 | 100 | 100 |

Compositions C20-C24 used only polycarbonate homopolymer, varying the amount of titanium dioxide. The sample thicknesses were 0.75 mm. The results are shown in Table 6.

TABLE 6

| | Unit | C20 | C21 | C22 | C23 | C24 |
|---|---|---|---|---|---|---|
| Polycarbonate | parts | 100 | 100 | 100 | 100 | 100 |
| PC—Si Copolymer | parts | 0 | 0 | 0 | 0 | 0 |
| PETs | phr | 0.4 | 0.4 | 0.4 | 0.4 | 0.4 |
| Heat Stabilizer | phr | 0.1 | 0.1 | 0.1 | 0.1 | 0.1 |
| UV Absorber | phr | 0.3 | 0.3 | 0.3 | 0.3 | 0.3 |
| $TiO_2$ | phr | 0 | 5 | 10 | 15 | 25 |
| L* @0.75 mm | | 96.5 | 96.8 | 97.6 | 97.8 | 97.9 |
| % T @0.75 mm | % | 91.3 | 2.6 | 1.2 | 0.6 | 0.2 |
| MVR | cc/10 min | 7.5 | 9.5 | 7.9 | 8.0 | 9.4 |
| Izod @ 23° C. | J/m | 956 | 903 | 748 | 733 | 156 |
| Ductility @ 23° C. | % | 100 | 100 | 100 | 100 | 0 |
| Izod @ −30° C. | J/m | 309 | 181 | 153 | 163 | 112 |
| Ductility @ −30° C. | % | 20 | 0 | 0 | 0 | 0 |

Comparing Tables 5 and 6, the homopolymer/polycarbonate-polysiloxane copolymer blend retained mechanical properties better than the polycarbonate homopolymer alone for larger amounts of titanium dioxide and at lower temperatures. There was also a significant drop in mechanical properties at 25 phr $TiO_2$.

Compositions C25-C30 used a blend of polycarbonate homopolymer and PC-Si copolymer, varying the amount of titanium dioxide and carbon black. The sample thicknesses were 0.75 mm. The results are shown in Table 7.

TABLE 7

| | Unit | C25 | C26 | C27 | C28 | C29 | C30 |
|---|---|---|---|---|---|---|---|
| Polycarbonate | parts | 82.5 | 82.5 | 82.5 | 82.5 | 82.5 | 82.5 |
| PC—Si Copolymer | parts | 17.5 | 17.5 | 17.5 | 17.5 | 17.5 | 17.5 |
| Heat Stabilizer | phr | 0.1 | 0.1 | 0.1 | 0.1 | 0.1 | 0.1 |
| UV Absorber | phr | 0.3 | 0.3 | 0.3 | 0.3 | 0.3 | 0.3 |
| Carbon Black | phr | 0 | 0.0001 | 0.0003 | 0.005 | 0.0001 | 0.0005 |
| $TiO_2$ | phr | 0 | 5 | 5 | 5 | 10 | 10 |
| L* @0.75 mm | | 93 | 96.1 | 95 | 84.2 | 96.9 | 95.6 |
| % T @0.75 mm | % | 80.9 | 2.5 | 1.6 | 0 | 0.7 | 0.3 |
| MVR | cc/10 min | 8.3 | 10.1 | 10.5 | 10.6 | 10.5 | 10.5 |
| Izod @ 23° C. | J/m | 915 | 860 | 840 | 851 | 802 | 797 |
| Ductility @ 23° C. | % | 100 | 100 | 100 | 100 | 100 | 100 |
| Izod @ −30° C. | J/m | 824 | 738 | 733 | 741 | 666 | 668 |
| Ductility @ −30° C. | % | 100 | 100 | 100 | 100 | 100 | 100 |

Compositions C31-C36 used only polycarbonate homopolymer, varying the amount of titanium dioxide and carbon black. The sample thicknesses were 0.75 mm. The results are shown in Table 8.

TABLE 8

| | Unit | C31 | C32 | C33 | C34 | C35 | C36 |
|---|---|---|---|---|---|---|---|
| Polycarbonate | parts | 100 | 100 | 100 | 100 | 100 | 100 |
| PC—Si Copolymer | parts | 0 | 0 | 0 | 0 | 0 | 0 |
| PETs | phr | 0.4 | 0.4 | 0.4 | 0.4 | 0.4 | 0.4 |
| Heat Stabilizer | phr | 0.1 | 0.1 | 0.1 | 0.1 | 0.1 | 0.1 |
| UV Absorber | phr | 0.3 | 0.3 | 0.3 | 0.3 | 0.3 | 0.3 |
| Carbon Black | phr | 0 | 0.0001 | 0.0003 | 0.005 | 0.0001 | 0.0005 |
| $TiO_2$ | phr | 0 | 5 | 5 | 5 | 10 | 10 |
| L* @0.75 mm | | 96.7 | 96.4 | 95.1 | 83.9 | 97.1 | 95 |
| % T @0.75 mm | % | 91.3 | 2.6 | 1.6 | 0 | 0.9 | 0.1 |
| MVR | cc/10 min | 7.1 | 8.7 | 8.9 | 9.0 | 9.6 | 9.2 |
| Izod @ 23° C. | J/m | 935 | 887 | 906 | 899 | 716 | 846 |
| Ductility @ 23° C. | % | 100 | 100 | 100 | 100 | 100 | 100 |
| Izod @ –30° C. | J/m | 304 | 188 | 146 | 150 | 129 | 148 |
| Ductility @ –30° C. | % | 20 | 0 | 0 | 0 | 0 | 0 |

Comparing Tables 7 and 8, again the homopolymer/polycarbonate-polysiloxane copolymer blend retained mechanical properties better than just the polycarbonate homopolymer. Comparing Tables 7 and 8 with Tables 1-6, it was also seen that the combination of small amounts of carbon black allowed a dramatic reduction in the amount of titanium dioxide needed to achieve the desired L* and % T values.

The results for L* from the compositions containing the copolymer were then graphed as a function of the amount of $TiO_2$ and carbon black ($C_1$-$C_7$, C15-19, C25-C30). Where multiple values were available, the value from C25-C30 was used. Otherwise, the lowest L* was used. For example, three values for zero $TiO_2$ and zero carbon black were available (from C1, C15, and C25). The value from C25, 93, was used. Results are shown in Table 9.

TABLE 9

L* plotted against % $TiO_2$ and % Carbon Black

| | % Carbon Black | | | | | | |
|---|---|---|---|---|---|---|---|
| % TiO2 | 0 | 0.0001 | 0.0003 | 0.0005 | 0.001 | 0.005 | 0.01 |
| 0 | 93 | 91.6 | 90 | 87.8 | 83.6 | 60.1 | 43.2 |
| 5 | 96.9 | 96.1 | 95 | | | 84.2 | |
| 10 | 97.5 | 96.9 | | 95.6 | | | |
| 15 | 97.7 | | | | | | |
| 25 | 97.9 | | | | | | |

The data showed that an acceptable L* was maintained if the amount of carbon black was less than 0.005 phr or less and if the amount of $TiO_2$ was zero or greater.

The results for % T from the compositions containing the copolymer were then graphed as a function of the amount of $TiO_2$ and carbon black ($C_1$-$C_7$, C15-19, C25-C30). Where multiple values were available, the value from C25-C30 was used. Otherwise, the highest % T was used. For example, three values for zero $TiO_2$ and zero carbon black were available (from C1, C15, and C25). The value from C25, 80.9, was used. Results are shown in Table 10.

TABLE 10

% T plotted against % $TiO_2$ and % Carbon Black

| | % Carbon Black | | | | | | |
|---|---|---|---|---|---|---|---|
| % TiO2 | 0 | 0.0001 | 0.0003 | 0.0005 | 0.001 | 0.005 | 0.01 |
| 0 | 80.9 | 78.8 | 78.6 | 76.5 | 72 | 46.8 | 27.2 |
| 5 | 2.8 | 2.5 | 1.6 | | | 0 | |
| 10 | 1 | 0.7 | | 0.3 | | | |
| 15 | 0.4 | | | | | | |
| 25 | 0.1 | | | | | | |

The data showed that an acceptable % T was achieved if the amount of $TiO_2$ was 5 phr or greater and the amount of carbon black was 0.005 phr or less.

The polycarbonate compositions of the present disclosure have been described with reference to exemplary embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A light-shielding polymer composition having (A) a whiteness L* of 80 or greater on the CIELAB scale; and (B) less than 1% transmission of white light when molded and measured at a thickness of 0.75 millimeter, wherein the composition comprises at least one whitener, at least one non-white colorant, and a blend of (i) a silicon-free polycarbonate polymer and (ii) a polycarbonate-polysiloxane copolymer, and the amount of the whitener is about 4 to about 9 parts per hundred parts of the blend.

2. The polymer composition of claim 1, wherein the polycarbonate polymer is a bisphenol A polycarbonate.

3. The polymer composition of claim 1, wherein the polysiloxane block of the polycarbonate-polysiloxane copolymer is derived from a polysiloxane having hydroxy end groups and having the formula:

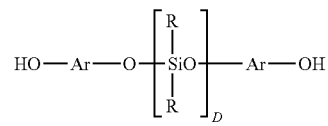

wherein D is from about 5 to about 200; each R is the same or different and is a $C_{1-13}$ monovalent organic group; and Ar is a substituted or unsubstituted $C_{6-30}$ arylene group; or the polysiloxane block of the polycarbonate-polysiloxane copolymer is derived from a polysiloxane having hydroxy end groups and having the formula:

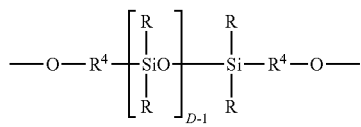

wherein D is on average from about 5 to about 200; each R is the same or different and is a $C_{1-13}$ monovalent organic group; and each $R^4$ is independently a $C_{1-30}$ organic group.

4. The polymer composition of claim 1, wherein the polysiloxane block of the polycarbonate-polysiloxane copolymer is derived from a polysiloxane having hydroxy end groups of the formula:

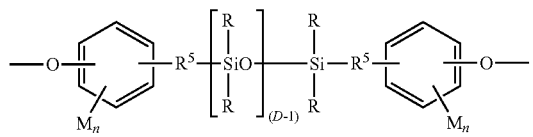

wherein D is on average from about 5 to about 200; each R is the same or different and is a $C_{1-13}$ monovalent organic group; each $R^5$ is independently a divalent $C_{2-8}$ aliphatic group; each M is the same or different and is a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy; and each n is independently an integer from 0 to 4.

5. The polymer composition of claim 1, wherein the polycarbonate-polysiloxane copolymer comprises the formula:

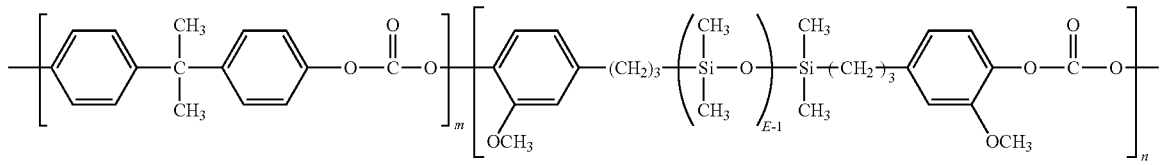

wherein E is on average from about 5 to about 200; and the weight ratio of m to n is from 99:1 to 90:10.

6. The polymer composition of claim 1, wherein the whitener comprises a light scattering agent selected from titanium dioxide, zinc oxide, or barium sulfate.

7. The polymer composition of claim 1, wherein the non-white colorant is carbon black.

8. The polymer composition of claim 7, wherein the carbon black is present in the amount of from greater than 0 to about 50 ppm.

9. The polymer composition of claim 1, wherein the non-white colorant is present in the amount of from greater than 0 to about 250 ppm.

10. The polymer composition of claim 1, wherein the composition comprises a blend of (i) a polycarbonate homopolymer and (ii) a polycarbonate-polysiloxane copolymer; titanium dioxide in the amount of from about 4 to about 9 parts per hundred parts of the blend; and carbon black in the amount of from greater than 0 to about 50 ppm.

11. The polymer composition of claim 1, having a whiteness L* of 85 or greater on the CIELAB scale.

12. The polymer composition of claim 1, having a whiteness L* of 90 or greater on the CIELAB scale.

13. The polymer composition of claim 1, having an impact strength of greater than 200 J/m at minus 30° C. when measured according to ASTM D256.

14. A molded article formed from the polymer composition of claim 1.

15. The molded article of claim 14, wherein the article is a housing for a portable electronic product, a sheet, a film, or a composite structure having at least one layer comprising the polymer composition.

16. A light-shielding polymer composition comprising:
a blend of (i) a silicon-free polycarbonate polymer and (ii) a polycarbonate-polysiloxane copolymer;
at least one light-scattering colorant in the amount of from about 4 to about 9 parts per hundred parts of the blend of (i) and (ii); and
at least one light-absorbing colorant in the amount of from greater than 0 to about 250 ppm;
wherein the composition has (A) a whiteness L* of 90 or greater on the CIELAB scale; and (B) less than 1% transmission of white light when molded and measured at a thickness of 0.75 millimeter.

17. The polymer composition of claim 16, wherein the light-scattering colorant is titanium dioxide.

18. The polymer composition of claim 16, wherein the light-absorbing colorant is carbon black.

19. A molded article formed from the polymer composition of claim 16.

20. A method of forming a molded article having (A) a whiteness L* of 80 or greater on the CIELAB scale; and (B) less than 1% transmission of white light when molded and measured at a thickness of 0.75 millimeter, comprising:
providing a polymer composition comprising at least one whitener, at least one non-white colorant, and a blend of (i) a silicon-free polycarbonate polymer and (ii) a polycarbonate-polysiloxane copolymer, wherein the amount of the whitener is about 4 to about 9 parts per hundred parts of the blend; and
molding the polymer composition to form a molded article.

21. The polymer composition of claim 1, wherein the composition has an impact strength of greater than 200 Joules per minute at minus 30° C. according to ASTM D256.

22. The polymer composition of claim 1, wherein the composition has an impact strength of greater than 650 Joules per minute at minus 30° C. according to ASTM D256.

* * * * *